US011887280B2

(12) United States Patent
Meng (10) Patent No.: US 11,887,280 B2
(45) Date of Patent: *Jan. 30, 2024

(54) METHOD, SYSTEM, AND COMPUTER-READABLE MEDIUM FOR IMPROVING QUALITY OF LOW-LIGHT IMAGES (71) Applicant: GUANGDONG OPPO MOBILE TELECOMMUNICATIONS CORP., LTD., Guangdong (CN)

(72) Inventor: Zibo Meng, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 179 days.

This patent is subject to a terminal disclaimer.

(21) Appl. No.: 17/306,676

(22) Filed: May 3, 2021

(65) Prior Publication Data

US 2021/0256657 A1    Aug. 19, 2021

Related U.S. Application Data (63) Continuation of application No. PCT/CN2019/105460, filed on Sep. 11, 2019.

(Continued)

(51) Int. Cl.
*G06T 5/00* (2006.01)
*G06T 3/40* (2006.01)
(Continued)

(52) U.S. Cl.
CPC ............ *G06T 5/002* (2013.01); *G06T 3/4007* (2013.01); *G06T 3/4046* (2013.01);
(Continued)

(58) Field of Classification Search
CPC ....... G06T 5/002; G06T 3/4046; G06T 5/009; G06T 5/20; G06T 9/002;
(Continued)

(56) References Cited

U.S. PATENT DOCUMENTS 8,872,856 B1 * 10/2014 Masterson ............. G09G 5/393
345/670
11,468,543 B1 * 10/2022 Wang ...................... G06T 5/009
(Continued)

FOREIGN PATENT DOCUMENTS

| CN | 107704866 | 2/2018 |
| CN | 108038823 | 5/2018 |

(Continued)

OTHER PUBLICATIONS

Tan, Z., Liu, B., Yu, N. (2017). PPEDNet: Pyramid Pooling Encoder-Decoder Network for Real-Time Semantic Segmentation. In: Zhao, Y., Kong, X., Taubman, D. (eds) Image and Graphics. ICIG 2017. Lecture Notes in Computer Science(), vol. 10666. Springer, Cham. https://doi.org/10.1007/978-3-319-71607-7_29 (Year: 2017).*

(Continued)

*Primary Examiner* — Andrae S Allison
(74) *Attorney, Agent, or Firm* — Hodgson Russ LLP (57) ABSTRACT In an embodiment, a method includes receiving a low-light digital image; generating, by at least one processor, a resulting digital image by processing the low-light digital image with an encoder-decoder neural network comprising a plurality of convolutional layers classified into a downsampling stage and an upsampling stage, and a multi-scale context aggregating block configured to aggregate multi-scale context information of the low-light digital image and employed between the downsampling stage and the upsampling stage; and outputting, by the at least one processor, the resulting digital image to an output device. In the upsam- (Continued)

pling stage, spatial resolution increases by using a bilinear interpolation operation performed before every few convolutional layers to speed up the inference time of the network.

17 Claims, 6 Drawing Sheets

Related U.S. Application Data (60) Provisional application No. 62/757,278, filed on Nov. 8, 2018.

(51) Int. Cl.
    *G06V 10/82* (2022.01)
    *G06V 10/44* (2022.01)
    *G06V 10/60* (2022.01)
    *G06V 10/98* (2022.01)

(52) U.S. Cl.
    CPC ............ *G06V 10/454* (2022.01); *G06V 10/60* (2022.01); *G06V 10/82* (2022.01); *G06V 10/993* (2022.01); *G06T 2207/20084* (2013.01)

(58) Field of Classification Search
    CPC . G06T 2207/20084; G06T 2207/20182; G06T 2207/10024; G06T 2207/20081
    See application file for complete search history.

(56) References Cited

U.S. PATENT DOCUMENTS

| | | | | |
|---|---|---|---|---|
| 2016/0239706 | A1* | 8/2016 | Dijkman | G06V 10/454 |
| 2017/0278546 | A1* | 9/2017 | Xiao | G06T 5/00 |
| 2017/0347110 | A1 | 11/2017 | Wang et al. | |
| 2018/0089505 | A1 | 3/2018 | El-Khamy et al. | |
| 2018/0114294 | A1* | 4/2018 | Yang | G06T 5/003 |
| 2018/0130180 | A1 | 5/2018 | Wang et al. | |
| 2020/0034948 | A1* | 1/2020 | Park | G06N 3/045 |
| 2020/0065969 | A1* | 2/2020 | Huang | G16H 50/50 |
| 2020/0084427 | A1* | 3/2020 | Sun | H04N 13/106 |
| 2021/0256667 | A1* | 8/2021 | Meng | G06T 7/90 |
| 2021/0279509 | A1* | 9/2021 | Meng | G06N 3/045 |
| 2022/0086410 | A1* | 3/2022 | Meng | G06T 5/007 |
| 2022/0207651 | A1* | 6/2022 | Meng | G06N 3/045 |
| 2022/0207870 | A1* | 6/2022 | Meng | G06F 18/24133 |

FOREIGN PATENT DOCUMENTS

| | | |
|---|---|---|
| CN | 108038832 | 5/2018 |
| CN | 108268870 | 7/2018 |
| CN | 108537793 | 9/2018 |
| CN | 108629743 | 10/2018 |
| CN | 108737823 | 11/2018 |

OTHER PUBLICATIONS

Li et al., Bottleneck feature supervised U-Net for pixel-wise liver and tumor segmentation, Expert Systems With Applications 145 (2020) 113131 (Year: 2020).*

Cai, Yutong, and Yong Wang. "Ma-unet: An improved version of unet based on multi-scale and attention mechanism for medical image segmentation." Third International Conference on Electronics and Communication; Network and Computer Technology (ECNCT 2021). vol. 12167. SPIE, 2022. (Year: 2022).*

Rudin et al., "Nonlinear total variation based noise removal algorithms," Physica D: Nonlinear Phenomena, 1992, vol. 60, pp. 259-268.

Portilla et al., "Image denoising using scale mixtures of Gaussians in the wavelet domain," IEEE Transactions on Image Processing, 2003, vol. 12, No. 11, pp. 1338-1351.

Mairal et al., "Non-local sparse models for image restoration," IEEE 12th International Conference on Computer Vision (ICCV), 2009, pp. 2272-2279.

Gu et al., "Weighted nuclear norm minimization with application to image denoising," IEEE Conference on Computer Vision and Pattern Recognition, 2014, 8 pages.

Dabov et al., "Image denoising by sparse 3D transform-domain collaborative filtering," IEEE Transactions on Image Processing, 2007, vol. 16, No. 8, 16 pages.

Jain et al., "Natural image denoising with convolutional networks," Advances in Neural Information Processing Systems 21 (NIPS), 2008, 8 pages.

Zhang et al., "Beyond a Gaussian denoiser: Residual learning of deep CNN for image denoising," IEEE Transactions on Image Processing, 2017, 13 pages.

Hasinoff et al., "Burst photography for high dynamic range and low-light imaging on mobile cameras," ACM Transactions on Graphics, 2016, vol. 35, No. 6, 13 pages.

Liu et al., "Fast burst images denoising," ACM Transactions on Graphics, 2014, vol. 33, No. 6, 9 pages.

Dong et al., "Fast efficient algorithm for enhancement of low lighting video," in IEEE International Conference on Multimedia and Expo, 2011, 6 pages.

Malm et al., "Adaptive enhancement and noise reduction in very low light-level video," IEEE 11th International Conference on Computer Vision, 2007, 8 pages.

Loza et al., "Automatic contrast enhancement of low-light images based on local statistics of wavelet coefficients,". Digital Signal Processing, 2013, vol. 23, No. 6, pp. 1856-1866.

Park et al., "Low-light image enhancement using variational optimization-based Retinex model," IEEE Transactions on Consumer Electronics, 2007, vol. 63, No. 2, pp. 178-184.

Guo et al., "LIME: Low-light image enhancement via illumination map estimation," IEEE Transactions on Image Processing, 2017, vol. 26, No. 2, pp. 982-993.

Chen et al., "Learning to See in the Dark," Conference on Computer Vision and Pattern Recognition, 2018, 10 pages.

Wang et al., "Multiscale structural similarity for image quality assessment," Proceedings of the 37th IEEE Asilomar Conference on Signals, Systems and Computers, 2003, 5 pages.

WIPO, International Search Report and Written Opinion for PCT/CN2019/105460, dated Nov. 27, 2019.

Yu et al., "Multi-Scale Context Aggregation by Dilated Convolutions," arXiv: 1511.07122v3, Apr. 30, 2016.

CNIPA, First Office Action for CN Application No. 201980069636.2, dated Oct. 25, 2023.

CNIPA, First Office Action for CN Application No. 201980072289.9, dated Oct. 26, 2023.

* cited by examiner

METHOD, SYSTEM, AND COMPUTER-READABLE MEDIUM FOR IMPROVING QUALITY OF LOW-LIGHT IMAGES

CROSS-REFERENCE TO RELATED APPLICATION

This application is a continuation of International Application No. PCT/CN2019/105460 filed Sep. 11, 2019, which claims priority to U.S. Application No. 62/757,278, filed Nov. 8, 2018. The entire disclosures of the aforementioned applications are incorporated herein by reference.

BACKGROUND OF THE DISCLOSURE

1. Field of the Disclosure

The present disclosure relates to the field of image processing, and more particularly, to a method, system, and computer-readable medium for improving quality of low-light images.

2. Description of the Related Art

Taking photos having good perceptual quality under low light conditions is extremely challenging due to a low signal-to-noise ratio (SNR). Extending exposure time can acquire visually good images; however, this can easily introduce motion blur, and it is not always applicable in real life.

To make the low-light images with short exposure time visually plausible, extensive study has been conducted including denoising techniques which aim at removing noises in the images due to the low light condition, and enhancement techniques which are developed for improving the perceptual quality of digital images.

However, current denoising approaches are generally evaluated using synthetic data, which are not generalized well to real images, and low-light enhancement approaches do not take the noise into consideration.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF THE EMBODIMENTS

The present disclosure is to propose a method, system, and computer-readable medium for improving quality of low-light images.

In a first aspect of the present disclosure, a method includes:
  receiving a digital image;
  generating, by at least one processor, a resulting digital image by processing the digital image with an encoder-decoder neural network including a plurality of convolutional layers classified into a downsampling stage and an upsampling stage, and a multi-scale context aggregating block configured to aggregate multi-scale context information of the digital image and employed between the downsampling stage and the upsampling stage; and
  outputting, by the at least one processor, the resulting digital image to an output device,
  wherein the generating the resulting digital image includes:
  performing a pooling operation after every few convolutional layers at the downsampling stage to decrease spatial resolution; and
  performing a bilinear interpolation operation before every few convolutional layers at the upsampling stage to increase the spatial resolution.

According to an embodiment in conjunction with the first aspect of the present disclosure, the convolutional layers at the upsampling stage include 1×1 convolutional layers.

According to an embodiment in conjunction with the first aspect of the present disclosure, before the generating the resulting digital image, the method further includes:
  determining whether at least one of a contrast value, a dynamic range, and a signal-to-noise ratio (SNR) of the digital image is lower than a threshold; and
  preforming the generating the resulting digital image in response to determining that at least one of the contrast value, the dynamic range, and the SNR is lower than the threshold.

According to an embodiment in conjunction with the first aspect of the present disclosure, the encoder-decoder neural network includes a U-net architecture.

According to an embodiment in conjunction with the first aspect of the present disclosure, the generating the resulting digital image further includes:
  concatenating the convolutional layers of the downsampling stage and the convolutional layers of the upsampling stage having a same resolution with the convolutional layers of the downsampling stage;
  extracting, by a global pooling layer of the multi-scale context aggregating block, global context information of the digital image; and
  extracting, by a plurality of dilation layers with various dilation rates of the multi-scale context aggregation block, context information of the digital image at different scales.

According to an embodiment in conjunction with the first aspect of the present disclosure, the global pooling layer and one of the dilation layers are concatenated, and the other dilation layers are concatenated in a cascading fashion with respect to corresponding scales.

According to an embodiment in conjunction with the first aspect of the present disclosure, the generating the resulting digital image further includes:
performing a bilinear interpolation operation to the global pooling layer.

According to an embodiment in conjunction with the first aspect of the present disclosure, the multi-scale context aggregating block includes:
a 1×1 convolutional layer connected after the global pooling layer and the dilation layers.

In a second aspect of the present disclosure, a system includes:
at least one memory configured to store program instructions;
at least one processor configured to execute the program instructions, which cause the at least one processor to perform steps including:
receiving a digital image;
generating a resulting digital image by processing the digital image with an encoder-decoder neural network including a plurality of convolutional layers classified into a downsampling stage and an upsampling stage, and a multi-scale context aggregating block configured to aggregate multi-scale context information of the digital image and employed between the downsampling stage and the upsampling stage; and
outputting the resulting digital image to an output device,
wherein the generating the resulting digital image includes:
performing a pooling operation after every few convolutional layers at the downsampling stage to decrease spatial resolution; and
performing a bilinear interpolation operation before every few convolutional layers at the upsampling stage to increase the spatial resolution.

According to an embodiment in conjunction with the second aspect of the present disclosure, the convolutional layers at the upsampling stage include 1×1 convolutional layers.

According to an embodiment in conjunction with the second aspect of the present disclosure, before the generating the resulting digital image, the method further includes:
determining whether at least one of a contrast value, a dynamic range, and a signal-to-noise ratio (SNR) of the digital image is lower than a threshold; and
performing the generating the resulting digital image in response to determining that at least one of the contrast value, the dynamic range, and the SNR is lower than the threshold.

According to an embodiment in conjunction with the second aspect of the present disclosure, the generating the resulting digital image further includes:
concatenating the convolutional layers of the downsampling stage and the convolutional layers of the upsampling stage having a same resolution with the convolutional layers of the downsampling stage;
extracting, by a global pooling layer of the multi-scale context aggregating block, global context information of the digital image; and
extracting, by a plurality of dilation layers with various dilation rates of the multi-scale context aggregation block, context information of the digital image at different scales.

According to an embodiment in conjunction with the second aspect of the present disclosure, the global pooling layer and one of the dilation layers are concatenated, and the other dilation layers are concatenated in a cascading fashion with respect to corresponding scales, and the multi-scale context aggregating block includes a 1×1 convolutional layer connected after the global pooling layer and the dilation layers.

According to an embodiment in conjunction with the second aspect of the present disclosure, the generating the resulting digital image further includes:
performing a bilinear interpolation operation to the global pooling layer.

In a third aspect of the present disclosure, a non-transitory computer-readable medium is provided with program instructions stored thereon, that when executed by at least one processor, cause the at least one processor to perform steps including:
receiving a digital image;
generating a resulting digital image by processing the digital image with an encoder-decoder neural network including a plurality of convolutional layers classified into a downsampling stage and an upsampling stage, and a multi-scale context aggregating block configured to aggregate multi-scale context information of the digital image and employed between the downsampling stage and the upsampling stage; and
outputting the resulting digital image to an output device,
wherein the generating the resulting digital image includes:
performing a pooling operation after every few convolutional layers at the downsampling stage to decrease spatial resolution; and
performing a bilinear interpolation operation before every few convolutional layers at the upsampling stage to increase the spatial resolution.

According to an embodiment in conjunction with the third aspect of the present disclosure, the convolutional layers at the upsampling stage include 1×1 convolutional layers.

According to an embodiment in conjunction with the third aspect of the present disclosure, before the generating the resulting digital image, the method further includes:
determining whether at least one of a contrast value, a dynamic range, and a signal-to-noise ratio (SNR) of the digital image is lower than a threshold; and
performing the generating the resulting digital image in response to determining that at least one of the contrast value, the dynamic range, and the SNR is lower than the threshold.

According to an embodiment in conjunction with the third aspect of the present disclosure, the generating the resulting digital image further includes:
concatenating the convolutional layers of the downsampling stage and the convolutional layers of the upsampling stage having a same resolution with the convolutional layers of the downsampling stage;
extracting, by a global pooling layer of the multi-scale context aggregating block, global context information of the digital image; and
extracting, by a plurality of dilation layers with various dilation rates of the multi-scale context aggregation block, context information of the digital image at different scales.

According to an embodiment in conjunction with the third aspect of the present disclosure, the global pooling layer and one of the dilation layers are concatenated, and the other dilation layers are concatenated in a cascading fashion with respect to corresponding scales, and the multi-scale context aggregating block includes a 1×1 convolutional layer connected after the global pooling layer and the dilation layers.

According to an embodiment in conjunction with the third aspect of the present disclosure, the generating the resulting digital image further includes:

performing a bilinear interpolation operation to the global pooling layer.

Figure 1:
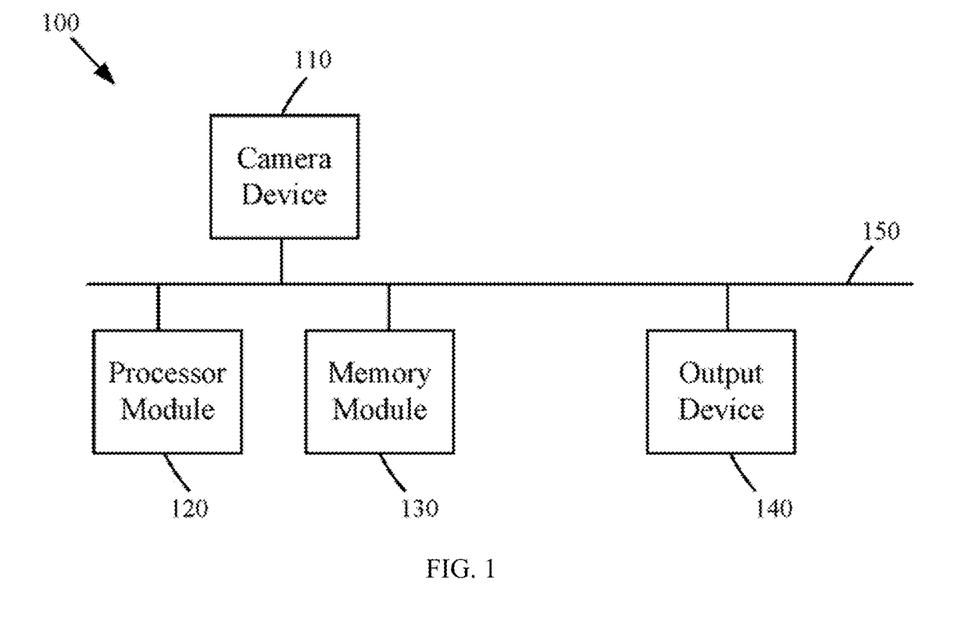
FIG. 1 is a diagram illustrating a terminal in accordance with an embodiment of the present disclosure.

FIG. 1 is a diagram illustrating a terminal 100 in accordance with an embodiment of the present disclosure. Referring to FIG. 1, the terminal 100 includes a camera device 110, a processor module 120, a memory module 130, an output device 140, and a bus 150 connecting to these modules and devices. The terminal 100 has an ability to perform low-light image denoising and enhancement. The terminal 100 can convert low-light images into images with good perceptual quality. The terminal 100 may be implemented by cell phones, smartphones, tablets, notebook computers, desktop computers, or any electronic device having enough computing power to perform the image processing.

The camera device 110 is configured to capture digital images. When the digital images are captured under low illumination conditions or with an insufficient amount of exposure time, it may be hard to identify the content of the captured digital images. These digital images may have low signal-to-noise ratio (SNR) and are classified as the low-light images. The camera device 110 may be implemented by an RGB camera or a CMYK camera. The camera device 110 is optionally included in the terminal 100. The terminal 100 may perform the image processing to the images with low SNR retrieved from the camera device 110 included in the terminal 100 or any image capturing apparatus outside the terminal 100, or an internal or external storage, or obtained via wired or wireless communication.

The memory module 130 may be a transitory or non-transitory computer-readable medium that includes a plurality of memory storing program instructions executable by the processor module 120. The processor module 120 includes at least one processor that send signals directly or indirectly to and/or receives signals directly or indirectly from the camera device 110, the memory module 130, and the output device 140 via the bus 150. The processor module 120 is configured to process the digital images (i.e., captured by the camera device 110) with low SNR, by means of a neural network model corresponding to parts of the memory storing program instructions, to generate images with reduced noises and enhanced quality. The neural network model is a key to achieve image denoising and image enhancement in a single process, and will be further described later.

The images generated by the processor module 120 using the neural network model are outputted by the processor module 120 to the output device 140. The output device 140 may be a storage, a display device, or a wired or wireless communication module for receiving outputted image data from the processor module 120. That is, resulting images with noises reduced and quality enhanced by means of the neural network model may be stored in the storage, displayed on the display device, or transmitted to an external apparatus outside the terminal 10 using an external wired or wireless communication module.

Figure 2:
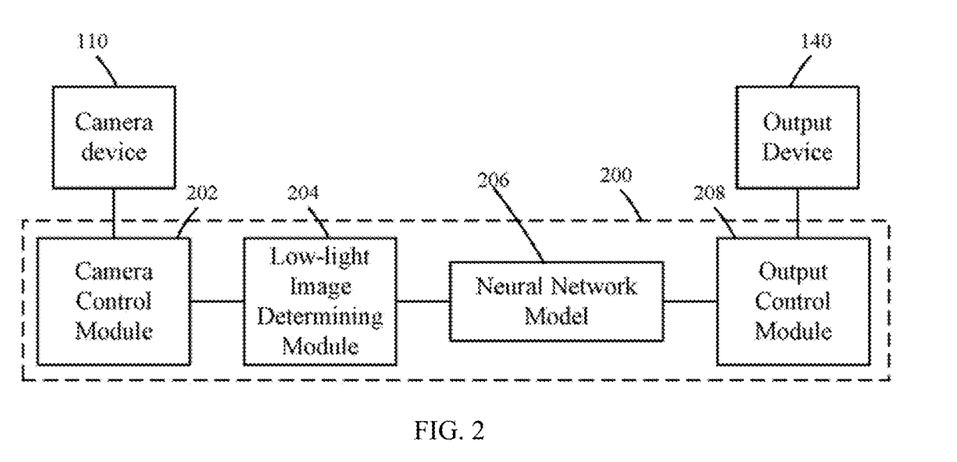
FIG. 2 is a block diagram illustrating software modules and associated hardware of the terminal in accordance with an embodiment of the present disclosure.

FIG. 2 is a block diagram illustrating software modules 200 and associated hardware of the terminal 100 in accordance with an embodiment of the present disclosure. The terminal 100 includes the software modules 200 stored in the memory module 130 and executable by the processor module 120. The software modules 200 include a camera control module 202, a low-light image determining module 204, a neural network model 206, and an output control module 208. The camera control module 202 is configured to cause the camera device 110 to take photos to generate a digital image. The low-light image determining module 204 is configured to determine whether the digital image captured by the camera device 110 is a low-light digital image. For example, a contrast value, a dynamic range, and an SNR of the digital image may be used to determine whether it is the low-light digital image. If the contrast value is too low, the dynamic range is too narrow, or the SNR is too small, the digital image is likely to be determined as the low-light digital image. If any one or any combination of the contrast value, the dynamic range, and the SNR is lower than a threshold, the low-light image determining module 204 may classify the captured digital image as the low-light digital image. The low-light digital image is then fed into the neural network model 206 for denoising and enhancement. A resulting digital image is outputted to the output control module 208. The output control module 208 controls transmission of the resulting digital image and decides which device the resulting digital image is to be outputted to, according to a user selection or default settings. The output control module 208 outputs the resulting digital image to the output device 140 such as a display device, a storage, and a wired or wireless communication device.

Figure 3:
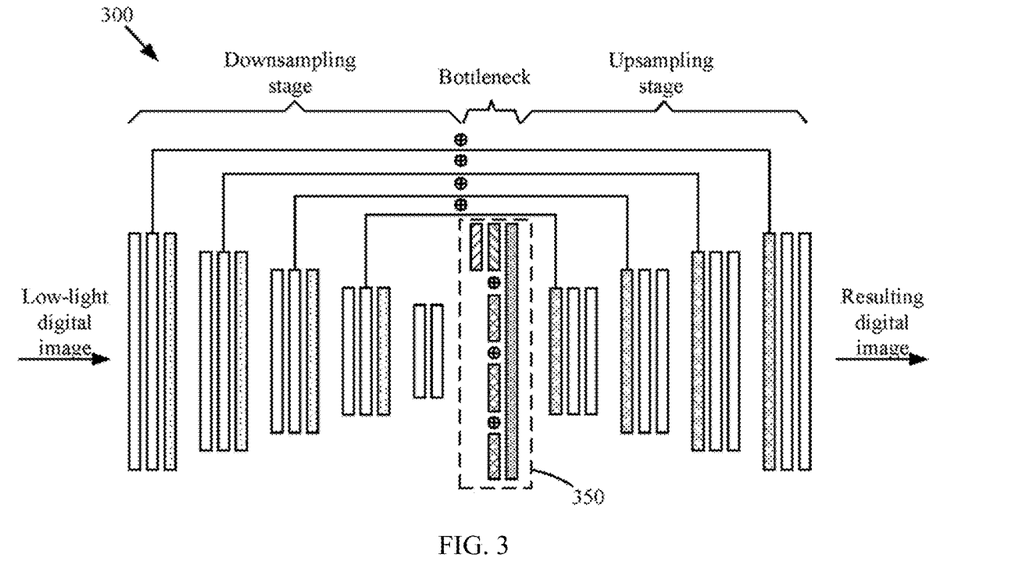
FIG. 3 is a graphical depiction illustrating an encoder-decoder neural network in accordance with an embodiment of the present disclosure.

FIG. 3 is a graphical depiction illustrating an encoder-decoder neural network 300 in accordance with an embodiment of the present disclosure. The neural network model 206 includes the encoder-decoder neural network 300, as shown in FIG. 3. The low-light digital image is inputted at a left side of the encoder-decoder neural network 300 and the resulting digital image is outputted at a right side of the encoder-decoder neural network 300. Given the low-light digital image, I, the encoder-decoder neural network 300 is employed to learn a mapping, I'=f(I:w), to generate the resulting digital image I' in an end-to-end fashion, where w is a set of learnable parameters of the encoder-decoder neural network 300. Learned parameters and the encoder-decoder neural network 300 are applied to the terminal 100 for image deposing and enhancing. An image taken in a low-light condition with a short exposure is visually unfriendly since it is extremely dark and noisy, where the color and details are invisible to users. By applying the encoder-decoder neural network 300 and the learned parameters, the image can be enhanced and the noise can be exhaustively removed for better representation on the terminal 100 with fruitful details and vivid colors.

Figure 4:
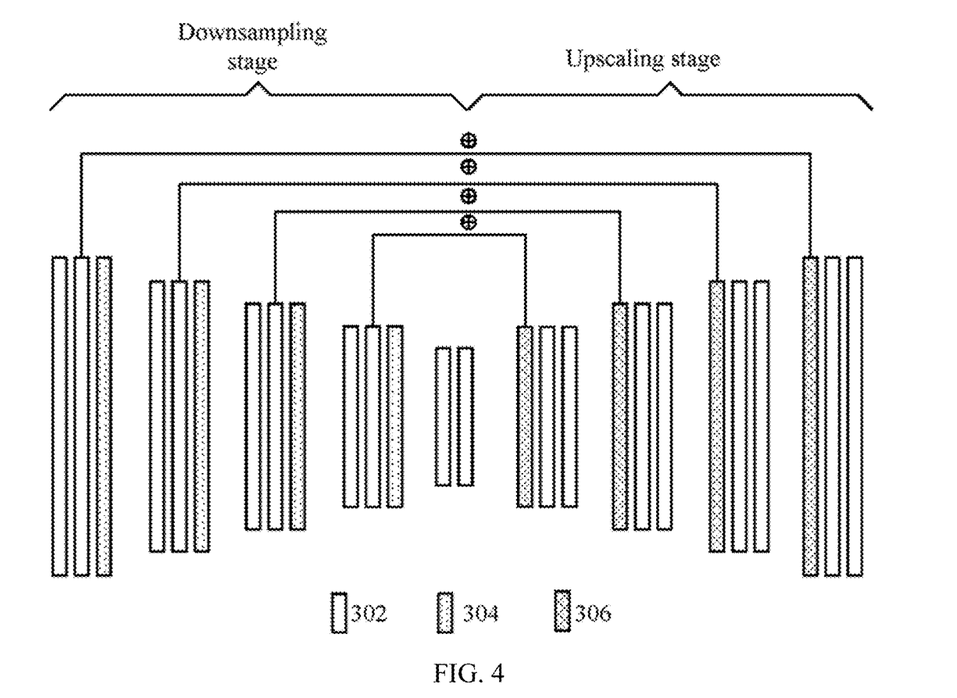
FIG. 4 is a graphical depiction showing the U-net architecture of the encoder-decoder neural network depicted in FIG. 3.
Figure 5:
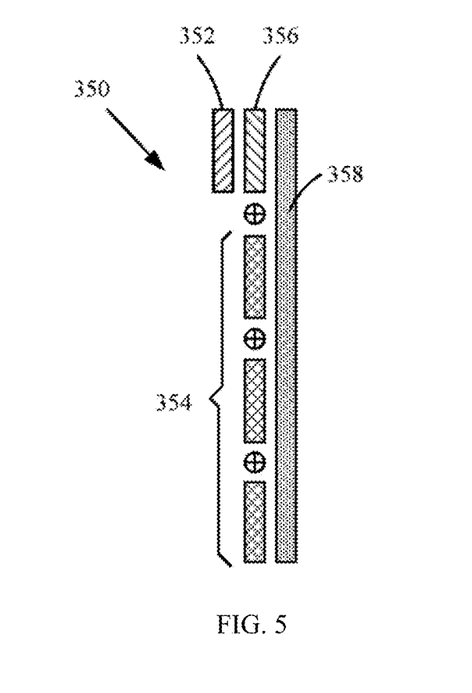
FIG. 5 is a graphic depiction showing the multi-scale context aggregating block depicted in FIG. 3.

The pipeline of the encoder-decoder neural network 300 is depicted in FIG. 3. The framework of the encoder-decoder neural network 300 can be divided into two parts, that is, a U-net architecture and a multi-scale context aggregating block 350. FIG. 4 is a graphical depiction showing the U-net architecture of the encoder-decoder neural network 300 depicted in FIG. 3. FIG. 5 is a graphical depiction showing the multi-scale context aggregating block 350 depicted in FIG. 3. The U-net architecture includes a downsampling stage and an upsampling stage, and the multi-scale context aggregating block 350 is employed at a bottleneck between the downsampling stage and the upsampling stage.

(1) The U-Net Architecture

Referring to FIGS. 3 and 4, the U-net architecture includes a plurality of convolutional layers 302 at the downsampling stage and at the upsampling stage. The convolutional layers 302 may be directed to multi-channel feature maps. In an example, each convolutional layer 302 may represent a 3×3 convolutional operation (with a 3×3 filter) and a Leaky ReLU operation. In an example, the U-net architecture may include 18 convolutional layers in total. The resolution gradually decreases and the number of the channels gradually increases for the convolutional layers at the downsampling stage. The resolution gradually increases and the number of the channels gradually decreases for the convolutional layers at the upsampling stage. The low-light digital image firstly goes through downsampling operations to extract abstract features, as well as to reduce the spatial resolution. After the bottleneck, the feature map will go through upscaling operations.

At the downsampling stage, a pooling layer (e.g., a max pooling layer) 304 is deployed after several convolutional layers 302. For example, the pooling layer 304 is disposed after every two convolutional layers 302. After every few convolutional layers 302, a pooling operation (e.g., a max pooling operation) is performed at the downsampling stage. The pooling operation reduces the resolution of a corresponding feature map. At the upsampling stage, an upscaling layer 306 is deployed before several convolutional layers 302. For example, the upscaling layer 306 is disposed before every two convolutional layers 302. Before every few convolutional layers 302, an upscaling operation is performed at the upsampling stage. The upscaling operation increases the resolution of a corresponding feature map. For example, the upscaling layer 306 is a deconvolutional layer or a transpose convolutional layer.

Further, the convolutional layers 302 of the downsampling stage and the convolutional layers 302 of the upsampling stage having a (substantially) same resolution (or at substantially same downsampling and upscaling level) with the convolutional layers 302 of the downsampling stage are concatenated. To be described more clearly, the upscaling layer 304 may be formed by upscaling a previous feature map next to the upscaling layer 304 and combining the upscaled feature map with a feature map at the downsampling stage at a level as the same as the upscaled feature map by means of copy and crop operations as needed. The concatenation operation is indicated by a symbol ⊕ as depicted in FIG. 4. This operation can effectively preserve the details in an image.

Examples of the U-net architecture are described in more detail by O. Ronneberger, P. Fischer, and T. Brox. "U-net: Convolutional networks for biomedical image segmentation". In MICCAI, 2015. 4, 5, 7, proposed to segment biomedical images. Other architectures such as an encoder-decoder network having similar structures throughout an encoder and a decoder are within the contemplated scope of the present disclosure.

However, the resulting image obtained by only using this U-net architecture to process the low-light digital image may have inconsistent colors at different locations since global context/color information are not taken into consideration. As described below, the present disclosure introduces the global context/color information into the encoder-decoder neural network 300.

(2) The Multi-Scale Context Aggregating Block

Referring to FIGS. 3 and 5, the multi-scale context aggregating block 350 is deployed at the bottleneck between the downsampling stage and the upsampling stage of the encoder-decoder neural network 300. The multi-scale context aggregating block 350 includes a global pooling layer 352 configured to extract global context/color information of the low-light digital image. The global pooling layer 352 may be obtained by means of a pooling operation performed to a previous convolutional layer 302 or a previous feature map next to the global pooling layer 352. The multi-scale context aggregating block 350 also includes a plurality of dilation layers 354 with various dilation rates configured to extract local context/color information of the low-light digital image at different scales. That is, a set of dilated convolutional operations with various dilation rates are employed to extract the local context/color information at different scales. Each dilation layer 354 may be obtained by means of dilation operation performed to a previous convolutional layer 302 or a previous feature map next to a corresponding dilation layer 354. For example, a 2-dilated convolutional operation is performed to a previous feature map to obtain one dilation layer and a 4-dilated convolutional operation is performed to the same to obtain another dilation layer. Dilation operation is an operation to increase the size of receptive field for a feature map, and is a known operation in the art.

Examples of multi-scale context aggregation are described in more detail by F. Yu, V. Koltun, "Multi-scale context aggregation by dilated convolutions", Proc. Int. Conf. Learn. Representations, 2016, used in image segmentation. Other architectures having similar structures throughout an encoder and a decoder are within the contemplated scope of the present disclosure.

As depicted in FIG. 5, the global pooling layer 352 and the dilation layers 354 are concatenated. In more details, the global pooling layer 352 and one of the dilation layers 354 are concatenated, and the other dilation layers 354 are concatenated in a cascading fashion with respect to corresponding scales. For example, the global pooling layer 352 and a first dilation layer obtained using a 2-dilated convolutional operation are concatenated, the first dilation layer and a second dilation layer obtained using a 4-dilated convolutional operation are concatenated, the second dilation layer and a third dilation layer obtained using a 8-dilated convolutional operation are concatenated, the third dilation layer and a fourth dilation layer obtained using a 16-dilated convolutional operation are concatenated, and so on.

The multi-scale context aggregating block 350 further includes a convolutional layer (e.g., a 1×1 convolutional layer) 358 connected after the global pooling layer 352 and the dilation layers 354. In more details, the global pooling layer 352 and the dilation layers 354 are concatenated channel-wisely followed by the convolutional layer 358 to generate a final representation containing multi-scale information of the low-light digital image.

The inputted low-light digital image may have arbitrary size or resolution, which means that the feature map in the bottleneck has arbitrary size. If a deconvolutional layer is applied after the global pooling layer 352, the size of kernel in the deconvolutional layer will be dynamic which is almost uncontrollable and not what we want to see. Thus, instead of using the deconvolutional layer, a bilinear upscaling layer 356 is used, in which a bilinear interpolation operation is employed to rescale the feature map back to the same size of the input feature map to perform the concatenation between the global pooling layer 352 and the dilation layers 354 and the following convolutional operations. In more details, the size of the feature map in the global pooling layer 352 is reduced with respect to the feature map in a previous layer. The bilinear interpolation operation can rescale the feature map in the global pooling layer 352 to have a size as the same as the feature map in the previous layer.

Figure 6:
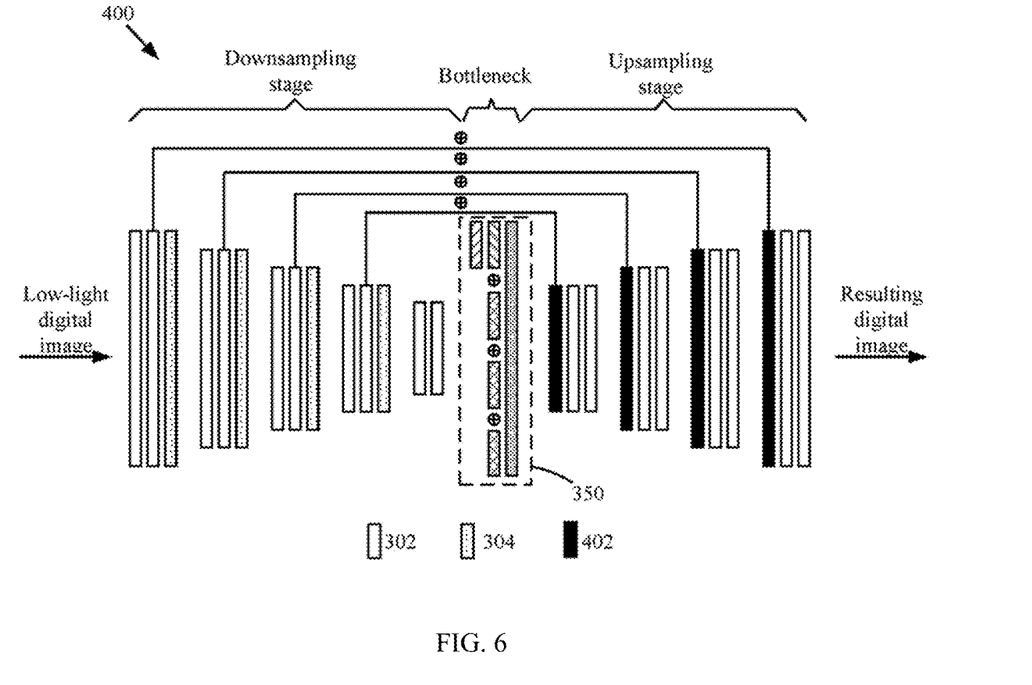
FIG. 6 is a graphical depiction illustrating an encoder-decoder neural network in accordance with another embodiment of the present disclosure.

FIG. 6 is a graphical depiction illustrating an encoder-decoder neural network 400 in accordance with another embodiment of the present disclosure. Referring to FIGS. 3 and 6, the upscaling layer 306 is employed by a bilinear interpolation layer 402. In order to speed up the inference time of the network, a bilinear interpolation operation is used in this embodiment instead of a deconvolutional operation or a transpose convolutional operation which is more computational intensive for upscaling. The bilinear interpolation layer 402 is obtained by means of the bilinear interpolation operation performed to a previous feature map.

Figure 7:
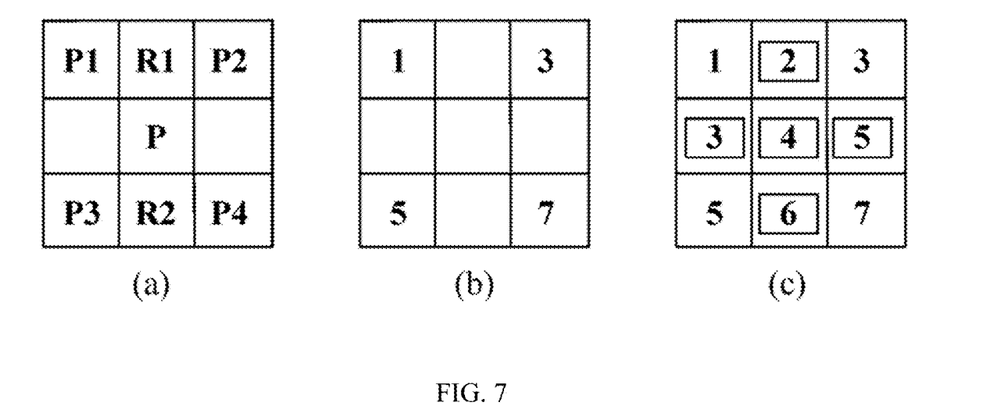
FIG. 7 is a diagram illustrating a bilinear interpolation operation in accordance with the present disclosure.

As illustrated in FIG. 7(a), the bilinear interpolation operation considers both x and y directions to determine the value of a pixel. Specifically, given four known pixels, P1 to P4, and their corresponding coordinates on an image, i.e., (x1, y1) to (x4, y4), and one pixel P with coordinate of (x, y) whose value is to be calculated, the value of pixels R1 and R2 can be firstly evaluated using linear interpolation along the horizontal direction as follows:

$$R1=(x-x1)/(x2-x1)*P1+(x2-x)/(x2-x1)*P2$$

$$R2=(x-x1)/(x2-x1)*P3+(x2-x)/(x2-x1)*P4$$

Then, the value of P can be estimated using linear interpolation along the vertical direction as:

$$P=(y-y1)/(y2-y1)*R1+(y2-y)/(y2-y1)*R2$$

For example, given a 2 by 2 image in FIG. 7(b), the values of P1 to P4 are 1, 3, 5, 7, respectively. As indicated in FIG. 7(c), a 3 by 3 image with the values of P1 to P4 and interpolated values 2 to 6 can be obtained by employing the bilinear interpolation operation.

Figure 8:
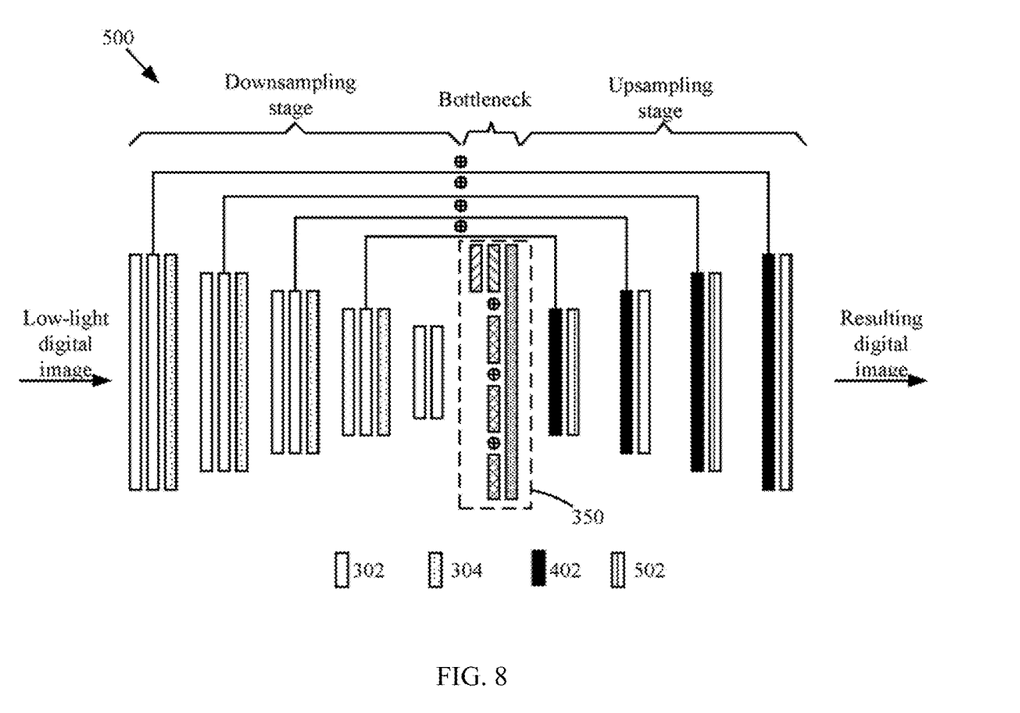
FIG. 8 is a graphical depiction illustrating an encoder-decoder neural network in accordance with yet another embodiment of the present disclosure.

FIG. 8 is a graphical depiction illustrating an encoder-decoder neural network 500 in accordance with yet another embodiment of the present disclosure. To further speed up the inference time of the network, 1×1 convolutional layers 502 are used in the upsampling stage instead of 3×3 convolutional layers. Since the 1×1 convolutional layers 502 are much cheaper than 3×3 convolutional layers in terms of the computational cost, the inference speed is improved in this embodiment. Further, the number of convolutional layers between every two bilinear interpolation layers or every two upscaling layers can be reduced to one to further speed up the calculations.

Since local and global context/color information is taken into consideration in the present disclosure in low-light image denoising and enhancement, the noise can be exhaustively removed and the image can be greatly enhanced in an end-to-end fashion, leading to better representation with fruitful details and vivid colors. Moreover, the inference speed is improved by using computational efficient layers in the decoder.

(3) Cost Functions

During the training process, the low-light digital images are fed into the network 300 as input, and a loss function is calculated between the system output and the corresponding long-exposure images. Loss function is a weighted joint loss of $l_1$ and multi-scale structured similarity index (MS-SSIM), which is defined as follows:

$$\mathcal{L} = \lambda \mathcal{L}^{\ell_1} + (1-\lambda)\mathcal{L}^{MS\text{-}SSIM}$$

where λ is set to 0.16 empirically; $\mathcal{L}^{\ell_1}$ is the $\ell_1$ loss defined by the following equation:

$$\mathcal{L}^{\ell_1} = \frac{1}{N}\sum_{i \in I}|I(i) - \hat{I}(i)|$$

where $\hat{I}$ and $I$ are the output image and the ground-truth image, respectively; N is the total number of pixels in the input image.

$\mathcal{L}^{MS\text{-}SSIM}$ represents MS-SSIM loss given by the equation below:

$$\mathcal{L}^{MS\text{-}SSIM} = 1 - MS\text{-}SSIM$$

For pixel i, the MS-SSIM is defined as:

$$MS-SSIM(i) = l_M^\alpha(i) \cdot \prod_{j=1}^{M} cs_j^{\beta_j}(i)$$

$$l(i) = \frac{2\mu_x\mu_y + C_1}{\mu_x^2 + \mu_y^2 + C_1}$$

$$cs(i) = \frac{2\sigma_{xy} + C_2}{\sigma_x^2 + \sigma_y^2 + C_2}$$

Where (x, y) represent the coordinates of pixel i; the means, i.e. $\mu_x, \mu_y$, and standard deviations, i.e. $\sigma_x, \sigma_y$, are calculated with a Gaussian filter, $G_g$, with zero mean and a standard deviation $\sigma_g$; M is the number of levels; and α,β are the weights to adjust the contribution of each component.

During the inference process, given an input image, the output image will be generated automatically through the well-trained network. Examples of the network are provided as follows:

Example I using the architecture of FIG. 3 with transpose convolutional layers (or deconvolutional layers) following by 3×3 convolutional layers;

Example II using the architecture of FIG. 6 with bilinear interpolation layers following by 3×3 convolutional layers; and Example III using the architecture of FIG. 8 with bilinear interpolation layers following by 1×1 convolutional layers;

The speed and performance for these examples in terms of peak signal-noise-ratio (PSNR) comparison are given in Table 1 below, where one single image with a size of 2848×4256 is processed on a single NVIDIA TITAN X GPU. Example III yields 0.15 s in speed. It is a huge improvement comparing with 0.22 s (Example I) and 0.18 s (Example II) with similar perceptual quality.

TABLE 1

|  | Example I | Example II | Example III |
|---|---|---|---|
| Speed (second) | 0.22 | 0.18 | 0.15 |
| PSNR | 29.82 | 29.77 | 29.51 |

Figure 9:
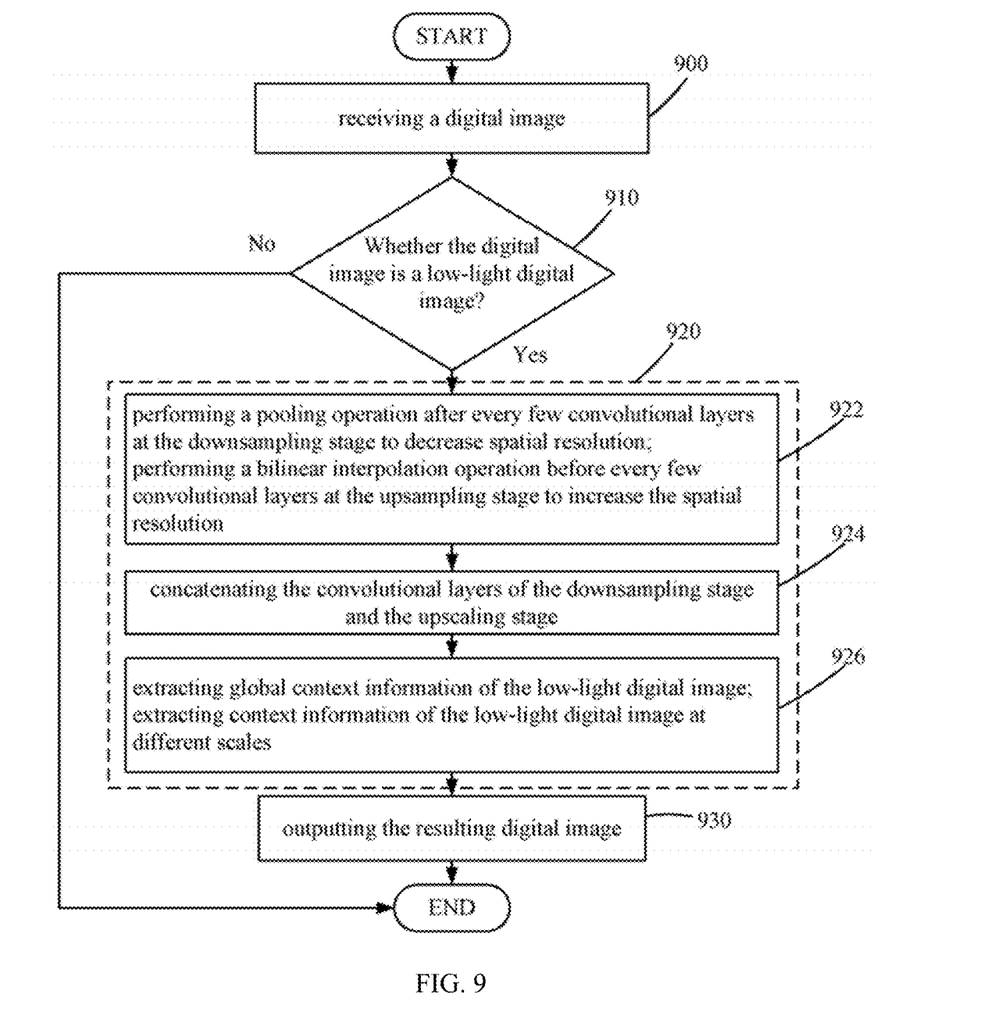
FIG. 9 is a flowchart illustrating a method for improving quality of low-light images in accordance with an embodiment of the present disclosure.

FIG. 9 is a flowchart illustrating a method for improving quality of low-light images in accordance with an embodiment of the present disclosure. Referring to FIGS. 1 to 9, the method includes the following blocks.

In block 900, the processor module 120 receives a digital image. Preferably, the digital image may be received from the camera device 110 of the terminal 100. In other conditions, the digital image may be transmitted from an external image capturing apparatus, or obtained via wired or wireless communication, or read from an internal or external storage.

In block 910, the low-light image determining module 204 determines whether the digital image captured by the camera device 110 is a low-light digital image. If any one or any combination of the contrast value, the dynamic range, and the SNR of the digital image is lower than a threshold, the digital image is determined to be the low-light digital image, and go to block 920 to use the encoder-decoder neural network to process the low-light digital image with image denoising and enhancement. If no, the process is terminated.

In block 920, the encoder-decoder neural network includes a plurality of convolutional layers 302 classified into a downsampling stage and an upsampling stage, and a multi-scale context aggregating block 350 configured to aggregate multi-scale context information of the low-light digital image and employed between the downsampling stage and the upsampling stage. The encoder-decoder neural network includes a U-net architecture.

In block 922, in the U-net architecture, a pooling operation is performed after every few convolutional layers 302 at the downsampling stage to decrease spatial resolution and a bilinear interpolation operation is performed before every few convolutional layers 302 at the upsampling stage to increase the spatial resolution.

In block 924, in the U-net architecture, the convolutional layers 302 of the downsampling stage and the convolutional layers 302 of the upsampling stage having a (substantially) same resolution (or at substantially same downsampling and upscaling level) with the convolutional layers 302 of the downsampling stage are concatenated. The concatenation means feature maps are combined by means of copy and crop operations as needed.

In block 926, multi-scale context aggregating block 350 includes the global pooling layer 352, the dilation layers 354, and the convolutional layer (e.g., a 1×1 convolutional layer) 358. The global pooling layer 352 extracts global context/color information of the low-light digital image; and the dilation layers 354 with various dilation rates extract local context/color information of the low-light digital image at different scales. The global pooling layer 352 and one of the dilation layers 354 are concatenated, and the other dilation layers 354 are concatenated in a cascading fashion with respect to corresponding scales. The convolutional layer 358 is connected after the global pooling layer 352 and the dilation layers 354 to generate a final representation containing multi-scale information of the low-light digital image. A bilinear interpolation operation may be performed to the global pooling layer 352 to rescale the size of the feature map in the global pooling layer 352 to a size as (substantially) the same as the input feature map.

Other details of the encoder-decoder neural network are referred to related descriptions in above context, and are not repeated herein.

In block 930, the encoder-decoder neural network outputs a resulting digital image and the processor module 120 outputs the resulting digital image to the output device 140 such as a display device, a storage, and a wired or wireless communication device.

Other details of the method for improving quality of low-light images are referred to related descriptions in above context, and are not repeated herein.

In the present disclosure, the digital image is processed using the encoder-decoder neural network. The network includes the convolutional layers classified into the downsampling stage and the upsampling stage, and the multi-scale context aggregating block configured to aggregate multi-scale context information of the digital image and employed between the downsampling stage and the upsampling stage. In comparison to existing arts, the present disclosure takes local and global context/color information of the digital image into consideration. Accordingly, the noise can be exhaustively removed and the image can be greatly enhanced for better representation with fruitful details and vivid colors. Moreover, the inference speed is improved by using computational efficient layers in the decoder.

A person having ordinary skill in the art understands that each of the units, modules, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and module in the above-mentioned embodiment since the working processes of the above-mentioned system, device, and module are basically the same. For easy description and simplicity, these working processes will not be detailed.

It is understood that the disclosed system, device, and method in the embodiments of the present disclosure can be realized with other ways. The above-mentioned embodiments are exemplary only. The division of the modules is merely based on logical functions while other divisions exist in realization. It is possible that a plurality of modules or components are combined or integrated in another system. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules for display are or are not physical modules, that is, located in one place or distributed on a plurality of network modules. Some or all of the modules are used according to the purposes of the embodiments.

Moreover, each of the functional modules in each of the embodiments can be integrated in one processing module, physically independent, or integrated in one processing module with two or more than two modules.

If the software function module is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method, comprising:
   receiving a digital image;
   generating, by at least one processor, a resulting digital image by processing the digital image with an encoder-decoder neural network comprising a plurality of convolutional layers classified into a downsampling stage and an upsampling stage, and a multi-scale context aggregating block configured to aggregate multi-scale context information of the digital image and employed between the downsampling stage and the upsampling stage; and
   outputting, by the at least one processor, the resulting digital image to an output device,
   wherein the generating the resulting digital image comprises:
      concatenating the convolutional layers of the downsampling stage and the convolutional layers of the upsampling stage having a same resolution with the convolutional layers of the downsampling stage;
      extracting, by a global pooling layer of the multi-scale context aggregating block, global context information of the digital image; and
      extracting, by a plurality of dilation layers with various dilation rates of the multi-scale context aggregation block, context information of the digital image at different scales.

2. The method according to claim 1, wherein the convolutional layers at the upsampling stage comprise 1×1 convolutional layers.

3. The method according to claim 1, wherein before the generating the resulting digital image, the method further comprises:
   determining whether at least one of a contrast value, a dynamic range, and a signal-to-noise ratio (SNR) of the digital image is lower than a threshold; and
   preforming the generating the resulting digital image in response to determining that at least one of the contrast value, the dynamic range, and the SNR is lower than the threshold.

4. The method according to claim 1, wherein the encoder-decoder neural network comprises a U-net architecture.

5. The method according to claim 1, wherein the global pooling layer and one of the dilation layers are concatenated, and the other dilation layers are concatenated in a cascading fashion with respect to corresponding scales.

6. The method according to claim 5, wherein the generating the resulting digital image further comprises:
   performing a bilinear interpolation operation to the global pooling layer.

7. The method according to claim 6, wherein the multi-scale context aggregating block comprises:
   a 1×1 convolutional layer connected after the global pooling layer and the dilation layers.

8. A system, comprising:
   at least one memory configured to store program instructions;
   at least one processor configured to execute the program instructions, which cause the at least one processor to perform steps comprising:
   receiving a digital image;
   generating a resulting digital image by processing the digital image with an encoder-decoder neural network comprising a plurality of convolutional layers classified into a downsampling stage and an upsampling stage, and a multi-scale context aggregating block configured to aggregate multi-scale context information of the digital image and employed between the downsampling stage and the upsampling stage; and
   outputting the resulting digital image to an output device,
   wherein the generating the resulting digital image comprises:
      concatenating the convolutional layers of the downsampling stage and the convolutional layers of the upsampling stage having a same resolution with the convolutional layers of the downsampling stage;
      extracting, by a global pooling layer of the multi-scale context aggregating block, global context information of the digital image; and
      extracting, by a plurality of dilation layers with various dilation rates of the multi-scale context aggregation block, context information of the digital image at different scales.

9. The system according to claim 8, wherein the convolutional layers at the upsampling stage comprise 1×1 convolutional layers.

10. The system according to claim 8, wherein before generating the resulting digital image, the method further comprises:
    determining whether at least one of a contrast value, a dynamic range, and a signal-to-noise ratio (SNR) of the digital image is lower than a threshold; and
    preforming the generating the resulting digital image in response to determining that at least one of the contrast value, the dynamic range, and the SNR is lower than the threshold.

11. The system according to claim 8, wherein the global pooling layer and one of the dilation layers are concatenated, and the other dilation layers are concatenated in a cascading fashion with respect to corresponding scales, and the multi-scale context aggregating block comprises a 1×1 convolutional layer connected after the global pooling layer and the dilation layers.

12. The system according to claim 11, wherein the generating the resulting digital image further comprises:
    performing a bilinear interpolation operation to the global pooling layer.

13. A non-transitory computer-readable medium with program instructions stored thereon, that when executed by at least one processor, cause the at least one processor to perform steps comprising:
    receiving a digital image;
    generating a resulting digital image by processing the digital image with an encoder-decoder neural network comprising a plurality of convolutional layers classified into a downsampling stage and an upsampling stage, and a multi-scale context aggregating block configured to aggregate multi-scale context information of the digital image and employed between the downsampling stage and the upsampling stage; and outputting the resulting digital image to an output device, wherein the generating the resulting digital image comprises:

concatenating the convolutional layers of the downsampling stage and the convolutional layers of the upsampling stage having a same resolution with the convolutional layers of the downsampling stage;

extracting, by a global pooling layer of the multi-scale context aggregating block, global context information of the digital image; and extracting, by a plurality of dilation layers with various dilation rates of the multi-scale context aggregation block, context information of the digital image at different scales.

14. The non-transitory computer-readable medium according to claim 13, wherein the convolutional layers at the upsampling stage comprise 1×1 convolutional layers.

15. The non-transitory computer-readable medium according to claim 13, wherein before the generating the resulting digital image, the method further comprises:

determining whether at least one of a contrast value, a dynamic range, and a signal-to-noise ratio (SNR) of the digital image is lower than a threshold; and performing the generating the resulting digital image in response to determining that at least one of the contrast value, the dynamic range, and the SNR is lower than the threshold.

16. The non-transitory computer-readable medium according to claim 13, wherein the global pooling layer and one of the dilation layers are concatenated, and the other dilation layers are concatenated in a cascading fashion with respect to corresponding scales, and the multi-scale context aggregating block comprises a 1×1 convolutional layer connected after the global pooling layer and the dilation layers.

17. The non-transitory computer-readable medium according to claim 16, wherein the generating the resulting digital image further comprises:

performing a bilinear interpolation operation to the global pooling layer.

* * * * *